Dec. 18, 1945.   W. H. HUNTER   2,391,241
PROTECTIVE COVERING FOR AIRCRAFT SURFACES AND THE LIKE
Filed Oct. 14, 1943
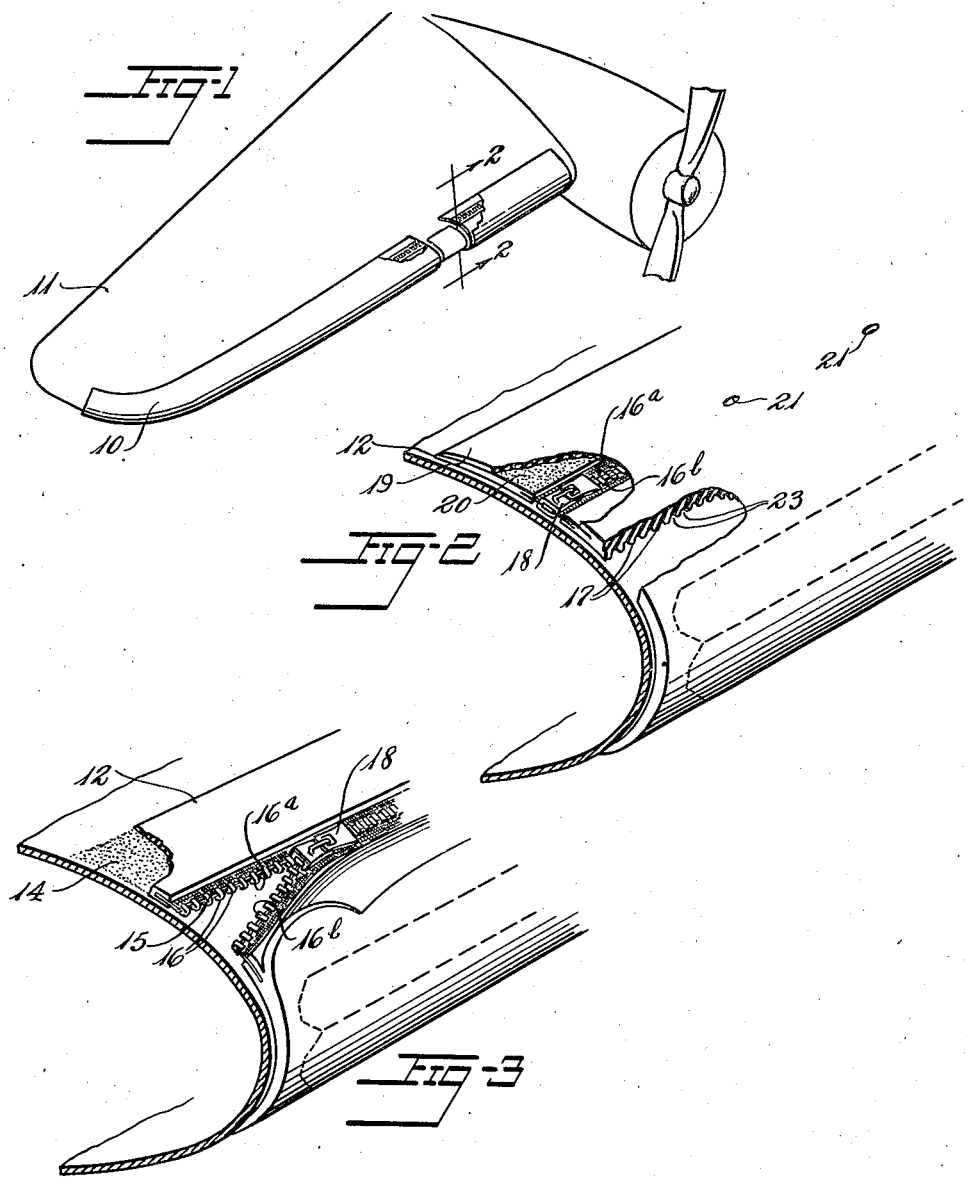
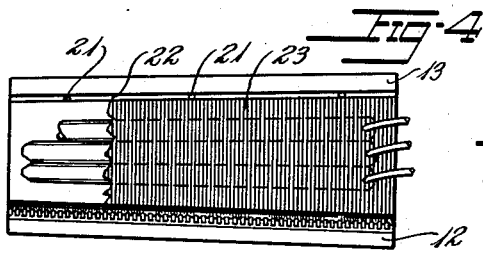

Patented Dec. 18, 1945

2,391,241

UNITED STATES PATENT OFFICE 2,391,241

PROTECTIVE COVERING FOR AIRCRAFT SURFACES AND THE LIKE

Willson H. Hunter, Akron, Ohio, assignor to The B. F. Goodrich Company, New York, N. Y., a corporation of New York Application October 14, 1943, Serial No. 506,156

3 Claims. (Cl. 244—134)

This invention relates to protective coverings for the surfaces of structures such, for example, as aircraft and other vehicles and is especially useful in its application to inflatable protective coverings for preventing accumulation of ice on the leading edge of wings and other airfoils.

An airfoil, for example a wing of an aircraft in flight, may be functioning under cruising, diving, climbing and stalling conditions, respectively, with corresponding variations in the aerodynamic force at the leading edge of the airfoil and especially in the area of negative pressure produced by the airfoil. When the wing is provided with an inflatable protective covering of flexible material, such, for example, as resilient rubber-like material, these variations in aerodynamic forces tend at times to cause portions of the covering to lift away or to bulge objectionably from the wing surface in areas in which it is not secured directly to such surface.

By the present invention provision is made for venting the air from beneath the covering thus increasing the adherence of the wing cover to the wing surface and preventing its lifting or bulging away from the wing. The passage for the elimination of air from beneath the wing covering is provided by a slide fastener which in addition serves to mount the cover in place and as it is closed, stretches the extensible portion of the covering and produces in the covering the desired degree of tension.

The chief objects of the invention are to provide a convenient means of stretching the covering tightly over the surface, to provide an egress for air from all parts of the area between the covering and the surface of the airfoil, to provide vents to the atmosphere at the ends of the fastener, and to accomplish these objects without necessitating modification of the wing surface or other structure upon which the covering is mounted.

These and other objects and advantages will be apparent from the following description, reference being made to the accompanying drawing, in which:

Fig. 1 is a perspective view with parts broken away of an airplane wing and a wing covering constructed in accordance with and embodying the invention.

Fig. 2 is a sectional view with parts broken away taken along line 2—2 of Fig. 1.

Fig. 3 is similar to Fig. 2 but shows the covering flap laid back to reveal the mechanism of the fastening device.

Fig. 4 is a bottom plan view, with parts broken away, showing a mode of providing passage for air from all parts of the inner surface of the covering to the fastener.

In the embodiment of the invention shown in the drawing, an inflatable protective covering or shoe 10 of elastic construction is mounted upon an airfoil 11 such, for example, as an aircraft wing. The upper and lower attaching margins 12 and 13 extend spanwise of the wing and are adhered to the airfoil 11 as by a suitable adhesive such, for example, as a coating of adhesive cement 14. To one margin 12 is attached one side of a slide fastener 15 comprising engageable teeth 16 between which and above and below which when the fastener is in closed position, spaces exist forming a continuous path along the fastener for passage of air. In order to insure the passage of air from the entire area between the surface and the inner face of the covering a series of parallel ribs or lands 17 extending chord-wise of the covering are constructed at the inner face of the covering. All channels in between adjacent ribs 17 connect with the spaces along the slide fastener 15 so that continuous passages exist from all parts of the surface under the covering through the channels between the ribs and along the slide fastener to its ends where the passages open to the atmosphere.

For installing the covering, it is made in two parts each containing an attachable margin 12 and 13 respectively, and one portion of the fastener 16a and 16b respectively, and each part is attached to the airfoil surface by a suitable adhesive 14 while under no chord-wise tension whatever. Then when both parts are securely fastened in their respective proper locations tension is applied to the parts at the starting end of the fastener to bring the two portions of the fastener together and thus permit their being joined by the slide mechanism 18. Along the entire remaining length of the covering its two parts may be drawn together and placed under the desired tension simply by moving the slide mechanism 18 lengthwise of the fastener to its other end. Finally, the flap 19 is brought over the attaching margin 12 previously coated with a suitable adhesive 20 and is then firmly rolled or pressed against it. Thus, the outer face of the covering is made even so as to avoid objectionable aerodynamic disturbance such as would result from roughened or irregular surfaces.

If more venting passages are desired than are presented by the openings at the ends of the slide fastener, perforations 21 may be made through the covering and located over the slide fastener or over a groove 22, extending spanwise of the covering, into which the chord-wise channels 23 between the ribs 17 connect. The use of these venting holes is optional and not essential in all cases.

Variations may be made without departing from the scope of the invention as it is defined in the following claims.

I claim:

1. A protective covering for the leading edge of an airfoil, said covering comprising an elastic sheet having spanwise attaching margins, said sheet being divided in the spanwise direction between said margins providing two sections, a slide fastener structure for joining said sections and including cooperating spaced-apart teeth defining passages for the flow of air therebetween, said fastener structure being adapted to conduct air along the length thereof and being open to the atmosphere at an end thereof, and a multiplicity of spaced-apart chordwise-extending ribs on the inner surface of said sheet terminating at said fastener structure and defining a multiplicity of chordwise-extending channels open to the conducting space provided by said fastener structure for communication of said inner surface with the atmosphere through said channels and fastener structure.

2. A protective covering for the leading edge of an airfoil, said covering comprising elastic sheet material and having spaced-apart attaching margins, said covering being divided in the direction of and between said margins providing separable sections, a slide fastener structure on said sections for joining the same including cooperating spaced-apart teeth defining in the closed condition of the fastener structure openings for flow of air between the teeth and having between the teeth and said covering conducting spaces above and below said teeth open to the atmosphere at an end of said fastener structure, and a multiplicity of spaced-apart ribs on the inner surface of said covering extending to said fastener structure and defining a multiplicity of spaced-apart channels open to said conducting spaces for communication of said inner surface with the atmosphere through said multiplicity of spaced-apart channels and said conducting spaces.

3. A protective covering for the leading edge of an airfoil, said covering comprising elastic sheet material and having spaced-apart attaching margins, said covering being divided in the direction of and between said margins providing separable sections, a slide fastener structure on said sections for joining the same including cooperating spaced-apart fastener elements defining in the closed condition of the fastener structure openings for flow of air between the fastener elements and having between said fastener elements and said covering a conducting space open to the atmosphere for venting air to the latter, and a multiplicity of spaced-apart ribs on the inner surface of said covering and defining a multiplicity of spaced-apart channels, at least some of said ribs extending to and terminating at said fastener structure and defining channels open to said conducting space for communication of said inner surface with the atmosphere through said multiplicity of spaced-apart channels and said conducting space.

WILLSON H. HUNTER.